United States Patent
Liu

(10) Patent No.: US 9,215,568 B2
(45) Date of Patent: Dec. 15, 2015

(54) DISTRIBUTED STORAGE AND SHARING OF DATA PACKETS IN HYBRID NETWORKS

(75) Inventor: Hui Liu, Clyde Hill, WA (US)

(73) Assignee: CMMB VISION USA INC., Central Hong Kong (HK)

( * ) Notice: Subject to any disclaimer, the term of this patent is extended or adjusted under 35 U.S.C. 154(b) by 56 days.

(21) Appl. No.: 13/457,135

(22) Filed: Apr. 26, 2012

(65) Prior Publication Data

US 2013/0286813 A1  Oct. 31, 2013

(51) Int. Cl.
*H04L 12/26* (2006.01)
*H04W 4/06* (2009.01)
*H04W 76/00* (2009.01)

(52) U.S. Cl.
CPC ............. *H04W 4/06* (2013.01); *H04W 76/002* (2013.01)

(58) Field of Classification Search
USPC .................. 370/216, 312, 328–339, 390, 370/395.5–395.52, 465, 474; 714/746, 748
See application file for complete search history.

(56) References Cited

U.S. PATENT DOCUMENTS

| | | | | |
|---|---|---|---|---|
| 5,928,331 | A * | 7/1999 | Bushmitch | 709/231 |
| 6,081,907 | A * | 6/2000 | Witty et al. | 714/6.1 |
| 7,349,358 | B2 * | 3/2008 | Hennessey et al. | 370/312 |
| 7,801,069 | B2 * | 9/2010 | Cheung | 370/312 |
| 2004/0010473 | A1 | 1/2004 | Hsu et al. | |
| 2007/0002750 | A1 | 1/2007 | Sang et al. | |
| 2007/0255846 | A1 * | 11/2007 | Wee et al. | 709/231 |
| 2008/0148123 | A1 * | 6/2008 | Pendakur et al. | 714/748 |
| 2008/0198785 | A1 * | 8/2008 | Huang et al. | 370/312 |
| 2008/0201752 | A1 * | 8/2008 | Liu et al. | 725/114 |
| 2009/0319824 | A1 | 12/2009 | Liu et al. | |

OTHER PUBLICATIONS

International Search Report and Written Opinion issued for PCT/US2013/037076, dated Jul. 1, 2013, 7 pages.

\* cited by examiner

*Primary Examiner* — Frank Duong
(74) *Attorney, Agent, or Firm* — Maier & Maier, PLLC

(57) ABSTRACT

Systems and methods provide distributed storage and sharing of data packets in hybrid networks to enable user devices (e.g., mobile terminals) to cooperate to recover lost data packets. According to embodiments, a centralized system operable to provide data transmission may optimize broadcast resources by adjusting redundancy in data packet transmission to enable a desired or a predetermined percentage of user devices to either successfully receive transmitted data packets using transmitted redundancies or to recover lost data packets relying on the distributed storage and sharing scheme.

19 Claims, 3 Drawing Sheets

DISTRIBUTED STORAGE AND SHARING OF DATA PACKETS IN HYBRID NETWORKS

CROSS-REFERENCE TO RELATED APPLICATIONS

The present application is related to co-pending and commonly assigned U.S. patent application Ser. No. 13/411,057, entitled "Systems and Methods for Hybrid Content Delivery," filed Mar. 2, 2012, the disclosure of which is incorporated herein by reference.

TECHNICAL FIELD

This invention relates to data communications and more particularly to distributed storage and sharing of data packets in hybrid networks.

BACKGROUND OF THE INVENTION

The use of data communication for delivery of various content, including digital data, documents, media (e.g., images, sound, etc.), multimedia, (e.g., images and sound), etc., has become nearly ubiquitous in recent years. One common architecture for providing such data communication includes a first data communication device and a second data communication device which are configured to communicate with each other over a network providing one or more data communication channel. Such data communication channels can be hard-wired or wireless. Examples of hard-wired data communication channels include broadband cable and digital subscriber line (DSL). Examples of wireless communications channels include Edge, 3G, 4G, WiMAX and Wi-Fi.

In one example of the use of data communication, a mobile communication device, such as a smart phone, a personal digital assistant (PDA), a tablet device, a portable personal computer (PC), can communicate with a centralized system, such as a web server, application server, database server, etc., providing data to and/or accepting from the mobile communication device via a network. The network may include a combination of communication channels utilized in providing data communication between the mobile communication device and the centralized system. For example, the mobile communication device may communicate with a broadband cellular station of the network using an Edge, 3G or 4G communication channel. The cellular station may then pass the communication along to a network router over a fiber-optic or T-carrier line. The network router may then pass the communication along to the centralized system over a broadband cable or DSL connection. That is, one or more different communication channels of the network may be utilized to provide the network link between the mobile communication device and the centralized system.

A number of communication techniques may be utilized in providing such data communications. For example, data communication may be provided using a uni-cast technique, whereby the data is transmitted as a uni-cast data stream by a first communication device (e.g., the aforementioned centralized system) to a particular second communication device (e.g., the aforementioned mobile communication device). Alternatively, data communication may be provided using a multi-cast technique, whereby the data is transmitted as a multi-cast data stream by a first communication device (e.g., the aforementioned centralized system) to a plurality of selected communication devices (e.g., specifically identified first and second mobile communication devices). Data communication may likewise be provided using a broadcast technique, whereby the data is transmitted as a broadcast data stream by a first communication device (e.g., the aforementioned centralized system) to a plurality of receiving communication devices (e.g., first and second mobile communication devices desirous of receiving the data, although not specifically identified for providing data to by the centralized system).

A communication technique may be utilized for delivering large amounts of data communication content (e.g., media files) to one or more mobile communication device via uni-directional network links and a uni-cast communication technique via bi-directional network links with the one or more mobile communication device to facilitate delivery and utilization of the data communication content. Such communication techniques deliver relatively large amounts of data communication content to data communication devices, such as a large number of mobile communication devices, in an efficient manner (e.g., low communication overhead, reduced overall use of the spectrum, efficient use of transmit power, reduced content delivery delay, optimized data redundancy, etc.). It should be noted that data communication content is transmitted to user devices without the capability of feedback from the user devices through uni-directional network links. It should also be noted that packet losses are essentially inevitable in broadcasting, particularly in wireless broadcasting. Such packet losses are represented by the failed receipt of data packets by the user devices.

According to an existing packet loss recovery technique, a linear combination of the data packets may be transmitted to a user device to enable the user device to recover lost packets. According to another existing technique, additional redundancy with the data packets may be transmitted to a user device. It will be appreciated that the existing packet loss recovery techniques consume significant amount of resources (e.g., bandwith, transmit power). Furthermore, a newly arriving user device typically cannot receive data communication content such as, for example, media files, which has been previously broadcast. For example, a new user device entering a network (i.e., coverage area of a network) may desire to receive a particular media file which has been previously broadcast by the centralized system. However, the new user device typically will not be able to receive the media file unless the media file is re-broadcast.

BRIEF SUMMARY OF THE INVENTION

The present invention is directed to systems and methods which provide distributed storage and sharing of data packets in hybrid networks to enable user devices (e.g., mobile terminals) to cooperate to recover lost data packets. According to embodiments, a centralized system operable to provide data transmission may optimize broadcast resources by adjusting redundancy in data packet transmission to enable a desired or a predetermined percentage of user devices to either successfully receive transmitted data packets using transmitted redundancies or to recover lost data packets relying on the distributed storage and sharing scheme. Embodiments of the invention further enable those user devices unable to recover lost data packets relying on the distributed storage and sharing scheme to rely on re-transmission of the data packets via a bi-directional network link of the hybrid network to receive the data packets.

According to embodiments, a centralized system operable to provide data transmission may optimize broadcast resources by adjusting redundancy in data packet transmission so that most of the user devices within a hybrid network can either successfully receive the data packets using transmitted redundancy in the data packets or can recover the data packets using the distributed sharing scheme. According to embodiments, if a majority of the user devices can recover lost data packets using the distributed storage and sharing scheme, the centralized system may decrease redundancy in data transmission in order to reduce usage of broadcast resources. On the other hand, if most of the user devices must rely on redundancy to receive the data packets because those user devices cannot rely on the distributed storage and sharing scheme to recover lost packets, the centralized system may increase redundancy in data transmission.

According to embodiments, a method establishes a bi-directional network link among 1 through N user devices and a uni-directional network link with the 1 through N user devices. A plurality of data packets is transmitted to the 1 through N user devices through the uni-directional network link. While the 1 through N user devices each attempts to receive all of the transmitted data packets, due to differing channel conditions (e.g., interference, channel fade), some of the user devices may successfully receive all of the transmitted data packets using redundancies in the transmission while other user devices may receive only some of the transmitted data packets or may receive some of the data packets that have been corrupted during transmission, thereby preventing some of the user devices from being able to recover all of the transmitted data packets. According to embodiments of the invention, the plurality of data packets are stored in a distributed manner by at least some of the 1 through N user devices each storing a portion of the data packets. A packet recovery scheme is implemented to enable one or more user devices (e.g., N user device) to receive the stored data packets from the other user devices (e.g., 1 through N−1 user devices) through peer-to-peer links. Such peer-to-peer links among the user devices may, for example, be Bluetooth, WiFi, and other communication links. Furthermore, those user devices unable to recover lost data packets relying on the distributed storage and sharing scheme may rely on re-transmission of the data packets by a centralized system via a bi-directional network link of the hybrid network to receive the data packets.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Embodiments of the invention provide distributed storage and sharing of data packets in hybrid networks to enable user devices (e.g., mobile terminals) to cooperate to recover lost data packets. According to embodiments, a centralized system operable to provide data transmission may optimize broadcast resources by adjusting redundancy in data packet transmission to enable a desired or a predetermined percentage of user devices to either successfully receive transmitted data packets using transmitted redundancies or to recover lost data packets relying on the distributed storage and sharing scheme.

Figure 1:
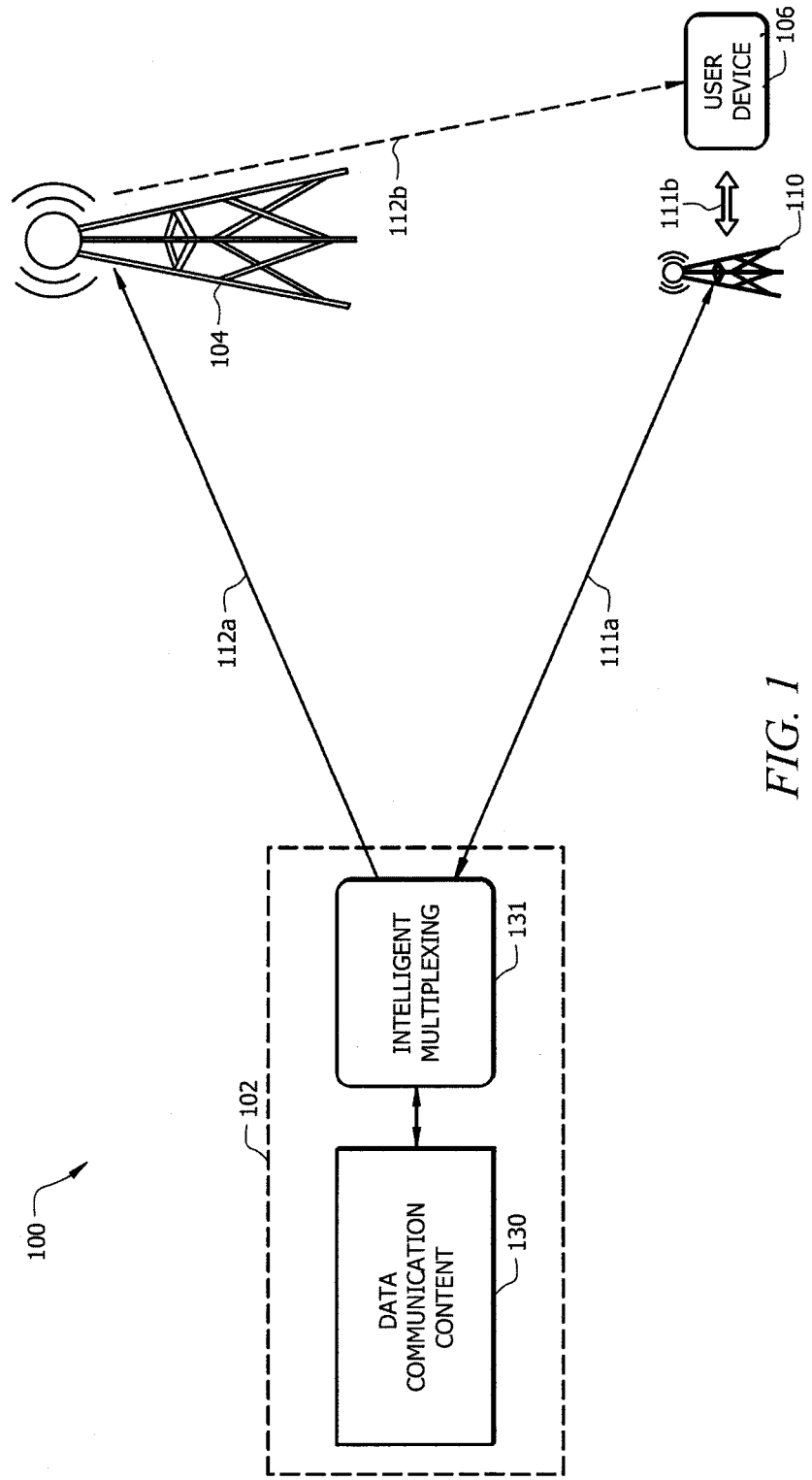
FIG. 1 show a system adapted for hybrid delivery of data communication content.

FIG. 1 shows a system 100 adapted for implementation of distributed storage and sharing of data packets in a hybrid network configuration according to embodiments. The hybrid network configuration of system 100 provides a plurality of different network links (i.e., network link 111, comprising communication channels 111a and 111b, and network link 112, comprising communication channels 112a and 112b) between the data communication devices of a data communication device pair (i.e., centralized system 102 and user device 106). Although only a single data communication device pairing is shown, a plurality of data communication device pairs, each provided a plurality of different network links, may be provided by a hybrid network configuration. For example, a plurality of user devices may be in communication with centralized system 102, wherein each such user device/centralized system pairing utilizes a plurality of network links similar to network links 111 and 112 of FIG. 1.

Centralized system 102 may comprise a plurality of systems (e.g., a server farm, an enterprise system, etc.) operable to provide data communication content transmission. Network links 111 and 112 used in providing data communication between centralized system 102 and user device 106 implement different communication techniques. For example, network link 111 may provide a bi-directional data communication link between centralized system 102 and user device 106, while network link 112 provides a uni-directional data communication link between the data communication devices. A hybrid network configuration of system 100 may, for example, utilize a broadcast communication technique with respect to network link 112 to deliver large amounts of data communication content to user device 106 and a uni-cast communication technique with respect to network link 111 to facilitate delivery to and utilization of the data communication content by user device 106. Such network links, implementing the different communication techniques, are used cooperatively to provide efficient delivery of data communication content. For example, network link 111 implementing bi-directional communications may be utilized for data communication content delivery, control signaling, etc. while network link 112 is correspondingly utilized for delivery of large amounts of data communication content.

Figure 2:
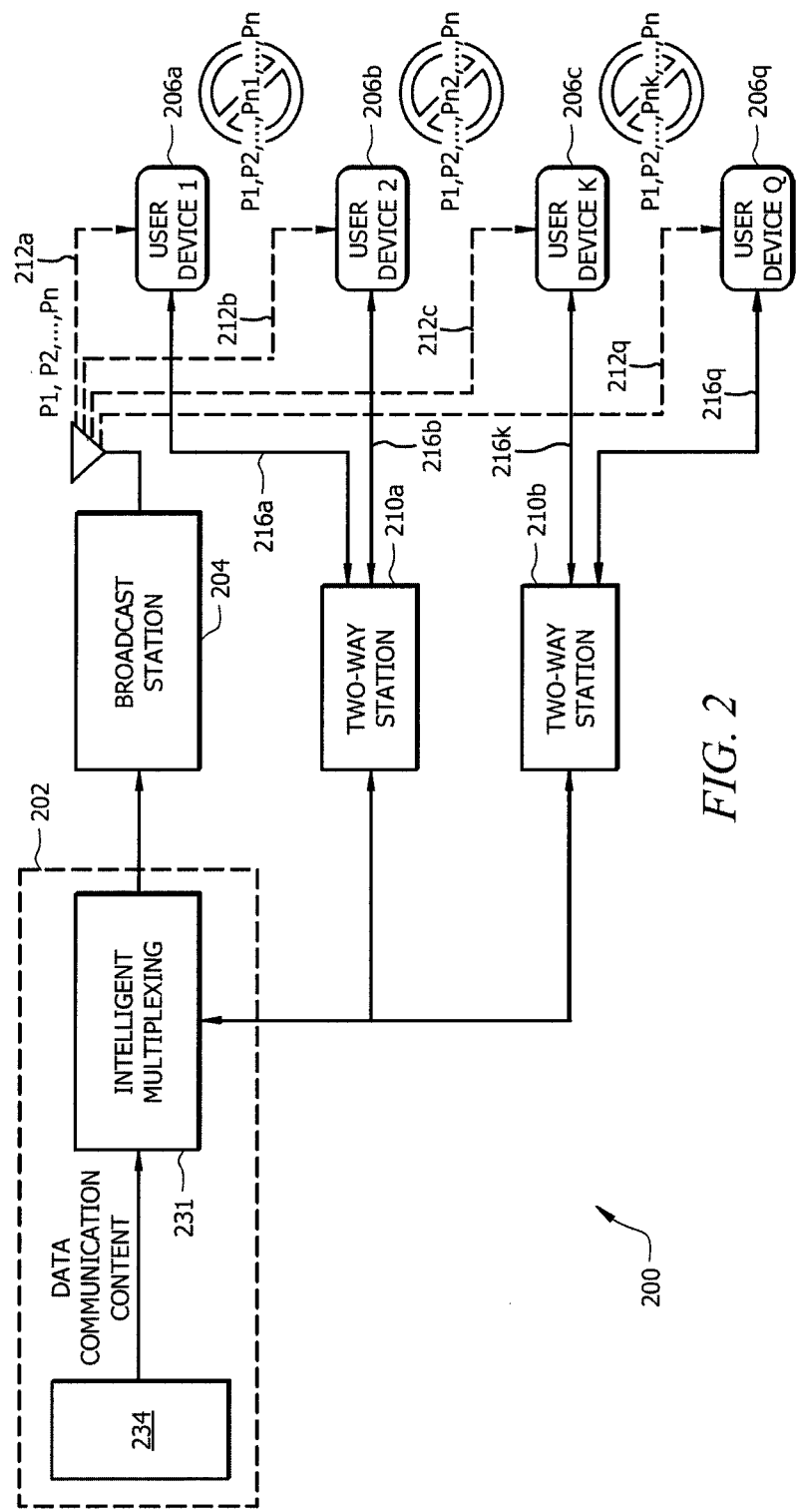
FIG. 2 illustrates hybrid network system adapted for distributed storage and sharing of data packets according to embodiments of the invention.

FIG. 2 illustrates a hybrid network configuration in further detail, which is adapted for distributed storage and sharing of data packets according to embodiments to enable user devices (e.g., mobile terminals) 206a-206k to cooperate to recover lost data packets. According to embodiments, centralized system 202 operable to provide data transmission may optimize broadcast resources by adjusting redundancy in data packet transmission to enable a desired or a predetermined percentage of user devices to either successfully receive transmitted data packets using transmitted redundancies or to recover lost data packets relying on the distributed storage and sharing scheme. Each of user devices 206a-206k has established a uni-directional network link with centralized system 202. Each such uni-directional network link may be utilized to provide broadcast communication between the centralized system and the respective user devices, such as for delivery of relatively large amounts of data communication content. For example, server 234 may operate to provide data communication content which is provided to broadcast station 204 via multiplexer 202. Broadcast station 204 may broadcast a stream of data packets, shown as data packets P1-Pn, formed from data communication content to be delivered to user devices 206a-206k via respective uni-directional network links 212a-212k.

Consider, for example, a scenario wherein user devices 206a through 206k-1 successfully received the data packets P1-Pn using the transmitted redundancies in the data packets but user device k did not successfully receive all of the transmitted data packets using the transmitted redundancies. Embodiments of the invention provide for distributed storage and sharing of data packets by user devices 206a-206k, which enable user device 206k to efficiently recover the lost data packets without relying on a re-broadcast from centralized system 202.

Figure 3:
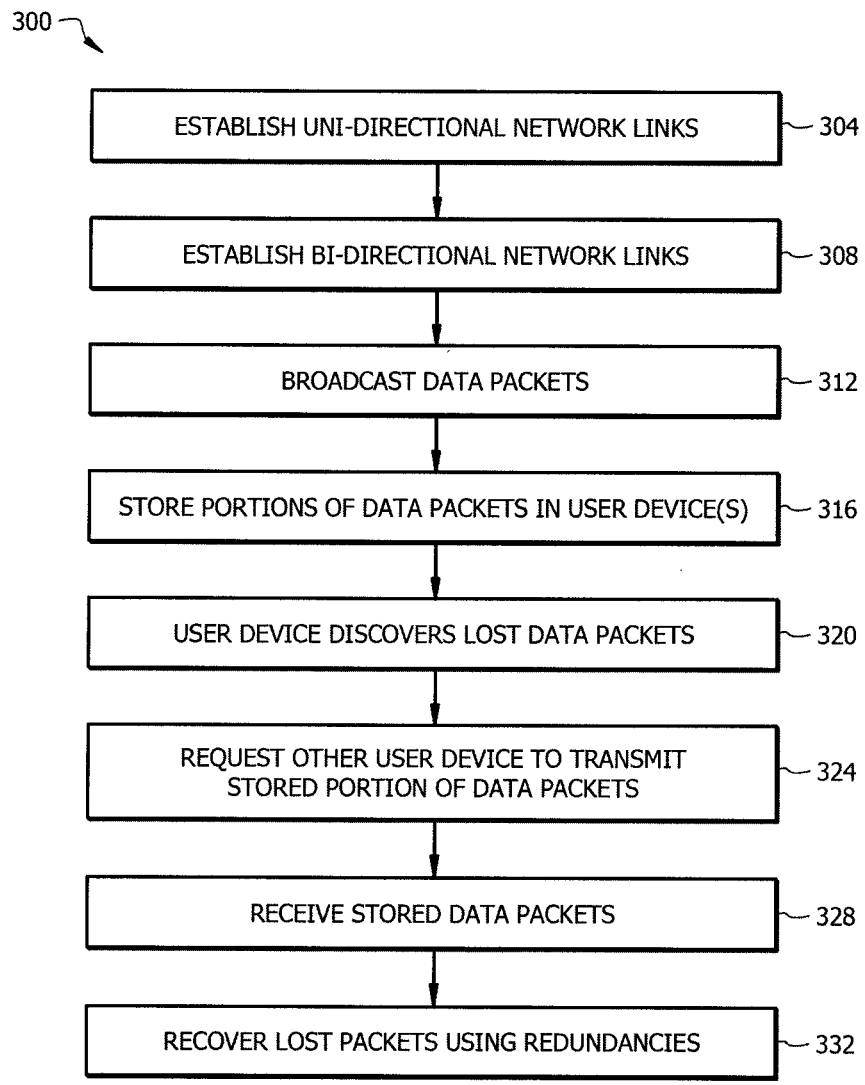
FIG. 3 is a flow diagram of method steps for distributed storage and sharing of data packets according to embodiments of the invention.

FIG. 3 is a flow diagram of method steps for distributed storage and sharing of data packets according to embodiments. In block 304, uni-directional network links between a broadcast station and a plurality of user devices are established. By way of example, uni-directional network links 212a-212k are established between broadcast station 204 and respective user devices 206a-206k. In block 308, bi-directional network links between two-way stations and the user devices are established. For example, bi-directional network links 216a-216k are established between two-way stations 210a-210k and respective user devices 206a-206k, which allow the user devices to communicate with one another. User devices 206a-206k may also communicate directly through peer-to-peer links.

In block 312, a stream of data packets P1-Pn are transmitted by broadcast station 204 to user devices 206a-206k via the uni-directional links. In block 316, the data packets are stored by at least a sub-set of user devices 206a-206k in a distributed manner. According to embodiments, at least a sub-set of user devices 206a-206k each stores its received portion of the data packets. It should be noted that the allocation of the storage of the data packets among the user devices depends on the particular scheme and may vary based on design consideration and channel conditions.

In block 320, one of the user devices (e.g., user device 206k) discovers that it did not successfully receive one or more data packets. By way of example, as illustrated in FIG. 2 user device 206k may discover that it did not successfully receive data packet Pnk. In block 324, user device 206k requests user devices 206a-206k-1 via the bi-directional links or directly through peer-to-peer links to transmit user their respective stored data packets. In other words, user device 206k asks the at least sub-set of user devices 206a-206k-1 that have stored data packets to transmit the packets to user device 206k.

In block 328, user device 206k receives through the bi-directional network or directly through peer-to-peer links the respective stored data packets from the other user devices. In block 332, user device 206k utilizes the redundancies in at least one of the received data packets to recover the lost data packets. It will be appreciated that user device 206k may be able to recover the lost data packets using redundancies in the transmitted portion of data packets from one or more user devices 206a-206k-1. In other words, user device 206 does not necessarily need to rely on transmitted portions of the data packets from all of the transmitting user devices.

According to embodiments, one or more user devices unable to recover any lost data packets using the distributed storage and sharing scheme may rely on the bi-directional network links to receive the packets from the centralized system 202 via re-transmission. By way of example, if user device 206Q is unable to recover any lost data packets using the distributed storage and sharing scheme, user device 206Q may request centralized system 202 to retransmit the data packets via bi-directional link 216Q. In response, centralized system 202 may retransmit the data packets via bi-directional link 216Q.

According to embodiments, centralized system 202 may adjust redundancies in the transmitted data packets to optimize usage of broadcast resources. For example, if user devices 206a-206k-1 are able to recover lost data packets using the distributed storage and sharing scheme and user device 206k is able to receive the data packets using the transmitted redundancies, centralized system 202 may decrease redundancies in the data packets since most of the user devices may rely on distributed storage and sharing scheme. On the other hand, if user devices 206a-206k-1 are unable to recover lost data packets using the distributed storage and sharing scheme and thus must rely on the redundancies in the transmitted packets and only user device 206k is able to rely on the distributed storage and sharing scheme, centralized system 202 may increase redundancies during transmission to ensure that user devices 206a-206k are all able to receive the data packets.

According to embodiments, the data packets P1-Pn may be divided into a plurality of segments, wherein each segment contains a portion of the data packets. According to embodiments, user devices 206a-206k may each store one or more segments. Alternatively, each user device may store a random number of data packets based on a predetermined rule or may store a predetermined number of data packets proportional to its processing capacity, storage capacity and/or transmission capacity. Alternatively, each user device may create a new set of data packets based on the packets received (i.e., P1-Pn), and store the resulting data packets which contain partial or all the information of the original data packets.

Embodiments of the invention enable a user device that has entered network 200 during, or subsequent to, the broadcast of the data packets P1-Pn to receive at least a part of the data packets by relying on the aforementioned distributed storage and sharing scheme. Consider, for example, a scenario wherein user device 206Q enters network 200 half-way through the broadcast of the data packets P1-Pn. User device 206Q may establish a bi-directional network link with user devices 206a-206k via two-way station 210b. Alternatively, user device 206Q may establish direct links with user devices 206a-206k through peer-to-peer links. User device 206Q may receive through bi-directional network link or through peer-to-peer links information regarding receipt of the data packets P1-Pn by user devices 206a-206k. Using the aforementioned sharing scheme, user device 206Q may receive from user devices 206a-206k respective stored portion of the data packets and thereafter reconstitute the entire stream of data packets using redundancies in the packets.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    establishing a uni-directional network link with 1 through N user devices;
    transmitting a plurality of data packets to the 1 through N user devices through the uni-directional network link, the plurality of data packets being stored in a distributed manner by at least a sub-set of the 1 through N user devices, wherein the at least a sub-set of the 1 through N user devices each stores its respective received portion of the data packets; and
    implementing a packet recovery scheme to enable at least one of the 1 through N user devices to receive the stored portion of data packets from at least one of the other 1 through N user devices without relying on a re-broadcast of any of the plurality of data packets from the uni-directional network link, wherein the stored data packets from the at least one of the other 1 through N user devices are only transmitted upon a request from the at least one of the 1 through N user devices.

2. The method of claim 1, wherein the packet recovery scheme comprises transmission of respective stored portions of data packets by the 1 through N user devices through a bi-directional link.

3. The method of claim 1, wherein the packet recovery scheme comprises transmission of respective stored portions of data packets by the 1 through N user devices through peer-to-peer links.

4. The method of claim 2, wherein the packet recovery scheme comprises reception by one of the user devices portions of the data packets transmitted through the bi-directional network link.

5. The method of claim 3, wherein the packet recovery scheme comprises reception by one of the user devices portions of the data packets transmitted through the peer-to-peer links.

6. The method of claim 1, wherein the packet recovery scheme comprises storing by the at least a sub-set of the 1 through N user devices a random number of data packets based on a predetermined rule.

7. The method of claim 1, wherein the packet recovery scheme comprises storing by the at least a sub-set of the 1 through N user devices a predetermined number of data packets proportional to the respective user device's transmission capacity.

8. The method of claim 1, wherein the uni-directional network link comprises a broadcast communication channel, and wherein the bi-directional network link comprises a data network communication channel.

9. The method of claim 8, wherein the broadcast communication channel comprises a television broadcast channel.

10. The method of claim 8, wherein the broadcast communication channel comprises a radio broadcast channel.

11. The method of claim 8, wherein the data network communication channel comprises a wireless local area network channel.

12. The method of claim 8, wherein the data network communication channel comprises a cellular network data channel.

13. A computer program product comprising a non-transitory computer readable media having computer executable code stored thereon, the computer executable code comprising:
    code for establishing a uni-directional network link with 1 through N user devices;
    code for transmitting a plurality of data packets to the 1 through N user devices through the uni-directional network link, the plurality of data packets being stored in a distributed manner by at least a sub-set of the 1 through N user devices, wherein the at least a sub-set of the 1 through N user devices each stores its respective received portion of the data packets; and
    code for implementing a packet recovery scheme to enable at least one of the 1 though N user devices to receive the stored data packets from at least one of the other 1 through N user devices without relying on a re-broadcast of any of the plurality of data packets from the uni-directional network link, wherein the stored data packets from the at least one of the other 1 through N user devices are only transmitted upon a request from the at least one of the 1 through N user devices.

14. The computer program product of claim 13, wherein the packet recovery scheme comprises transmission of respective stored portions of data packets by the 1 through N user devices through peer-to-peer links.

15. The computer program product of claim 13, wherein the uni-directional network link comprises a broadcast communication channel, and wherein the bi-directional network link comprises a data network communication channel.

16. The computer program product of claim 15, wherein the broadcast communication channel comprises a television broadcast channel.

17. The computer program product of claim 15, wherein the broadcast communication channel comprises a radio broadcast channel.

18. The computer program product of claim 15, wherein the data network communication channel comprises a wireless local area network channel.

19. The computer program product of claim 15, wherein the data network communication channel comprises a cellular network data channel.

* * * * *